United States Patent [19]

Wolfseder et al.

[11] 4,129,504

[45] Dec. 12, 1978

[54] VAT FOR SEPARATING WORT FOR SPENT GRAIN

[75] Inventors: Alfons Wolfseder; Hans Urban, both of Freising; Simon Redl, Reichertshausen, all of Germany

[73] Assignee: Anton Steinecker Maschinenfabrik GmbH, Freising, Germany

[21] Appl. No.: 765,818

[22] Filed: Feb. 4, 1977

[30] Foreign Application Priority Data

Feb. 25, 1976 [DE] Fed. Rep. of Germany ....... 2607562

[51] Int. Cl.² .............................................. C02C 1/14
[52] U.S. Cl. .................................. 210/247; 210/418; 210/446
[58] Field of Search .................. 210/153, 163–166, 210/247, 252, 255, 261, 262, 264, 266, 283, 285, 291–293, 418, 420, 433 R, 446; 261/114 R; 23/272, 269 B, 272.6, 270.5 T, 270 R, 208; 99/278

[56] References Cited

U.S. PATENT DOCUMENTS

| 108,538 | 10/1870 | Walsh | 210/247 |
| 117,635 | 8/1871 | Ils | 210/247 |
| 125,322 | 4/1872 | Mott | 210/163 |
| 1,378,925 | 5/1921 | White | 210/247 |
| 1,440,192 | 12/1922 | White | 210/247 |

*Primary Examiner*—Frank Sever
*Attorney, Agent, or Firm*—Marshall & Yeasting

[57] ABSTRACT

A refining vat for the separation of wort from spent grain comprises a sieve base and an impervious discharge base which lies below the sieve base and surrounds a central drain outlet. An intermediate base is substantially concentric with and is smaller in diameter than the sieve base, and is disposed between the sieve base and the discharge base and acts as an accumulator and guide element for the wort.

1 Claim, 1 Drawing Figure

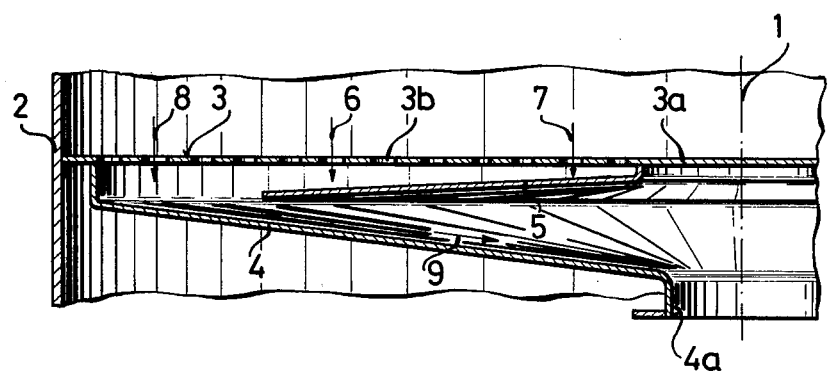

VAT FOR SEPARATING WORT FOR SPENT GRAIN

BACKGROUND OF THE INVENTION

This invention relates to a refining vat for the separation of wort from spent grain, comprising a sieve base having below it a discharge base with a central drain hole.

Refining vats are used in breweries for separating the extract-rich wort from the spent grain.

In the designing of these refining vats, care must be taken not only to prevent the wort from draining away too quickly (which might cause the liquid layer below the sieve base to be broken) but also to prevent excessively slow drainage of the wort (which might cause undesirable stagnation in the space between the sieve base and the discharge base). In the latter case there would be a particular risk of the spent grain in the radially outer portions of the refining vat not being uniformly leached, with the leaching instead taking place preferentially in those more central portions of the vat which lie closer to the central drain hole.

SUMMARY OF THE INVENTION

The invention is therefore directed to the problem of avoiding these disadvantages while constructing a refining vat, of the type initially described, in such manner that uniform leaching of the entire layer of grain is ensured in a constructionally very simple manner.

According to the invention this problem is solved by disposing between the sieve base and the discharge base an intermediate base acting as an accumulator and guide element, whose cross-sectional area is smaller than that of the sieve base.

This intermediate base prevents the wort from draining away too quickly from the centrally disposed spent grain and thereby leaching too poorly the grain which lies further outwards. Instead the construction in accordance with the invention ensures substantially uniform leaching of the entire layer of grain.

BRIEF DESCRIPTION OF THE DRAWING

The drawing is a schematic vertical section of the lower portion of a refining vat in accordance with the invention.

DESCRIPTION OF THE PREFERRED EMBODIMENT

The substantially cylindrical refining vat, with an axis 1 and an outer wall 2, has a sieve base 3 whose central portion 3a is impermeable to fluids, and which in the remainder of its area has a plurality of fluid outlets consisting for instance of slots 3b.

Below the sieve base 3 is disposed a discharge base 4 which is inwardly inclined in funnel form and has a central drain hole 4a.

In accordance with the invention there is disposed between the sieve base 3 and the discharge base 4 an intermediate base 5 which is joined to the edge of the central sieve base portion 3a and has a slightly outwardly inclined, or flattened frusto-conical shape.

The diameter of the intermediate base 5 is from 0.6 to 0.8, and preferably about 0.7 times the inner diameter of the vat; in the latter case about half the cross-sectional area of the sieve base 3 lies beyond the outer edge of the intermediate base.

As the drawing shows, wort which drops down through the sieve base 3, in the vicinity of arrows 6, 7 for instance, cannot directly reach the drain hole 4a. Instead the intermediate base 5, acting as an accumulator and guide element, forces the wort first to flow outwards before it can join with the wort passing through the sieve base 3 in the region of arrow 8, and then to flow towards the drain hole 4a (arrow 9). In this manner substantially uniform leaching of the entire layer of grain located above the sieve base 3 is ensured.

What we claim is:

1. A refining vat for the separation of wort from spent grain, having a substantially cylindrical side wall, and apparatus for controlling the draining of the wort from the spent grain so as to cause the wort to leach with substantial uniformity the layer of grain in the vat, said apparatus consisting of:
   (a) a flat sieve base in the vat, having a central portion which is impervious to fluids,
   (b) an intermediate base which has a slightly outwardly inclined, flattened frusto-conical shape and has its upper edge joined to the outer edge of said central impervious portion of the sieve base, the diameter of said intermediate base being from 0.6 to 0.8 times the inner diameter of said cylindrical side wall, to cause the wort to leach with substantial uniformity the layer of grain which lies on said sieve base and is surrounded by said substantially cylindrical wall, and
   (c) a discharge base below the intermediate base, which is inwardly inclined in funnel form and has a central drain hole, to cause the wort to flow down the discharge base and directly into said drain hole.

* * * * *